United States Patent [19]

Stein

[11] 4,196,416
[45] Apr. 1, 1980

[54] SYNCHRONIZATION APPARATUS WITH VARIABLE WINDOW WIDTH AND SPACING AT THE RECEIVER

[75] Inventor: Hermann Stein, Munich, Fed. Rep. of Germany

[73] Assignee: Steuerungstechnik GmbH, Munich, Fed. Rep. of Germany

[21] Appl. No.: 964,708

[22] Filed: Nov. 29, 1978

Related U.S. Application Data

[63] Continuation-in-part of Ser. No. 829,311, Aug. 31, 1977, Pat. No. 4,137,522.

[30] Foreign Application Priority Data

Sep. 1, 1976 [DE] Fed. Rep. of Germany ....... 2639363

[51] Int. Cl.² .............................................. H04Q 9/00
[52] U.S. Cl. ........................ 340/147 R; 340/147 SY
[58] Field of Search ...... 340/147 R, 147 SY, 147 LP, 340/168 R; 178/53.1

[56] References Cited

U.S. PATENT DOCUMENTS

3,903,504  9/1975  Rogers ..................... 340/147 SY

Primary Examiner—Harold I. Pitts
Attorney, Agent, or Firm—Marianne Rich

[57] ABSTRACT

A transmitter transmits a sequence of synchronization signals at a predetermined repetition rate and at least one synchronization signal at a spacing in time different from said synchronization signals to signify the start of the message. At the receiver, a window is generated and the locally generated synchronization signal is retimed every time a received synchronization signal falls outside of the window. The window is generated by a counter which controls a flip-flop. To compensate for jitter in the received synchronization signal and yet maintain the window as narrow as possible, the size of the window is decreased from a maximum at the beginning of the message and the position in time of the window relative to a center position at which a jitter-free synchronization pulse would be received is varied as a function of the number of received synchronization signals.

13 Claims, 11 Drawing Figures

SYNCHRONIZATION APPARATUS WITH VARIABLE WINDOW WIDTH AND SPACING AT THE RECEIVER

CROSS-REFERENCE TO RELATED APPLICATIONS:

The present application is a continuation-in-part application of applicant's application Ser. No. 829,311 filed 08/31/77 now U.S. Pat. No. 4,137,522 and assigned to the same assignee.

The present invention relates to systems transmitting messages in digital form and, in particular, to systems wherein synchronization signals locally generated at the receiver must be synchronized to synchronization signals transmitted by the transmitter. More particularly, it relates to communication systems in which the digital data is modulated onto a high frequency carrier.

BACKGROUND AND PRIOR ART

For digital communication systems of the above-described type, it is necessary that the receiver recognize the beginning and possibly even the end of a message. In known systems of this type the start of the transmission from the transmitter contains a relatively long bit pattern which is utilized both to effect the above-mentioned synchronization and to identify the beginning of the actual message. This type of synchronization and recognition of message start is relatively vulnerable to noise in the transmission channel. Further, the relatively large synchronization bit pattern which is required causes a corresponding loss in the information transmitting capacity. This type of synchronization is therefore not practical for, for example, mobile units such as automobile telephones or CB radios since these are based on an initiating call and subsequent acknowledgement prior to the actual message. Shortening of the synchronization bit pattern and a resulting increase of the information carrying capacity is not possible because the reliability of the system would be substantially decreased. It must be considered that due to noise any kind of a bit pattern may appear in which, for a synchronization bit pattern of, for example, eight bits, the particular pattern will appear after $8(2^8-1)$ noise bits. For a data transmission of 2400 bits per second the synchronization bit pattern can therefore appear once per second as a random noise pattern.

U.S. application Ser. No. 829,311, the parent case for this application, discloses a system in which a synchronization pattern can be achieved with a minimum number of bits while still being relatively immune to noise. For this purpose, the transmitter first transmits a sequence of synchronization signals at a predetermined repetition rate. To signify the beginning or the end of the message, the transmitter generates a synchronization signal which is spaced in time from the last previous synchronization signal by a distance unequal to the spacing between previous synchronization signals. At the receiver, a sequence of window signals is generated at the same predetermined repetition rate. A coincidence circuit determines whether the window and the received synchronization signal occur at the same time. The transmitted synchronization signal at the start of the message falls outside of the window. If the locally generated synchronization signals are synchronized to receive synchronization signals falling outside of the window, then the start of the message can be recognized because it is immediately preceded by a synchronization signal falling outside of the window.

The received synchronization signals will have a jitter which is dependent upon the transmission characteristics of the channel. This jitter will cause the received synchronization signals to occur at time instances varying about a central value to a greater or lesser degree. If the window signals generated at the receiver are not sufficiently large, some synchronization signals may fall out of the window due to the jitter. Thus the window must be sufficiently wide to encompass received synchronization signals which depart from the expected time instant only due to jitter, while still causing the transmitted synchronization signal which is purposely asymmetrical to the expected time instant to be recognized. Further, very wide windows have the disadvantage that the immunity to error decreases as a function of the window width raised to the power of erroneous information steps.

SUMMARY OF THE INVENTION:

It is an object of the present invention to furnish a system wherein the beginning and possibly the end of a message can be reliably recognized even though a minimum number of bits is utilized.

In accordance with the present invention, means are provided which decrease the window signal duration starting from a maximum window signal duration at the beginning of reception. Since the window signal duration is a maximum at the beginning of the message, the synchronization process is substantially independent of jitter in the received synchronization signals. The subsequent decrease in the size of the window increases the immunity to error.

In a preferred embodiment, the decrease in the time duration of the window occurs in conjunction with a phase correction. If the received synchronization signals are affected by jitter, and therefore are received at a time instant asymmetrical to the average time at which synchronization signals from the transmitter are received, then a decrease in the time duration of the window is accompanied by a shift of the timing of the window towards the above-mentioned average time instant. Specifically, the spacing in time of sequential window signals is varied as a function of the phase between the locally generated synchronization signals and the received synchronization signals. The spacing in time is either increased or decreased until any phase difference between these two signals is eliminated. To establish the time average value, the distance between sequential window signals is alternately increased and decreased relative to the average value by equal time increments. The spacing and time of sequential windows therefore oscillates about the average time value. Phase correction can be carried out by suppressing this increase or decrease of the time spacing either once or, if required, a number of times.

The magnitude of the time element may preferably vary as a function of the width of the window, the time increments being smaller the smaller the window width. In this way the effect of initial asymmetries in the received synchronization signals is eliminated and an exact synchronization of the locally generated synchronization signals to the received synchronization signals is achieved.

The present invention is particularly suitable if the information is coded in an error correcting cyclical code. The number of synchronization signals transmitted by the transmitter at a different spacing than that corresponding to the predetermined repetition rate must then be one larger than the number of correctable errors in the code. Synchronization only takes place when the number of received synchronization signals which fall outside of the window exceeds the number of correctable errors in the code. A system of the present invention is thus particularly useful in conjunction with information transmitted with an error correcting code.

The present invention, both as to its construction and its method of operation, together with additional objects and advantages thereof, will best be understood from the following description of preferred embodiments when read in connection with the accompanying drawing.

BRIEF DESCRIPTION OF THE DRAWINGS

FIG. 3a-d are timing diagrams illustrating the effects of jitter on the received synchronization signals;

FIG. 6a-c are pulse diagrams for illustrating the operation of the circuit of FIG. 5.

Figure 1:
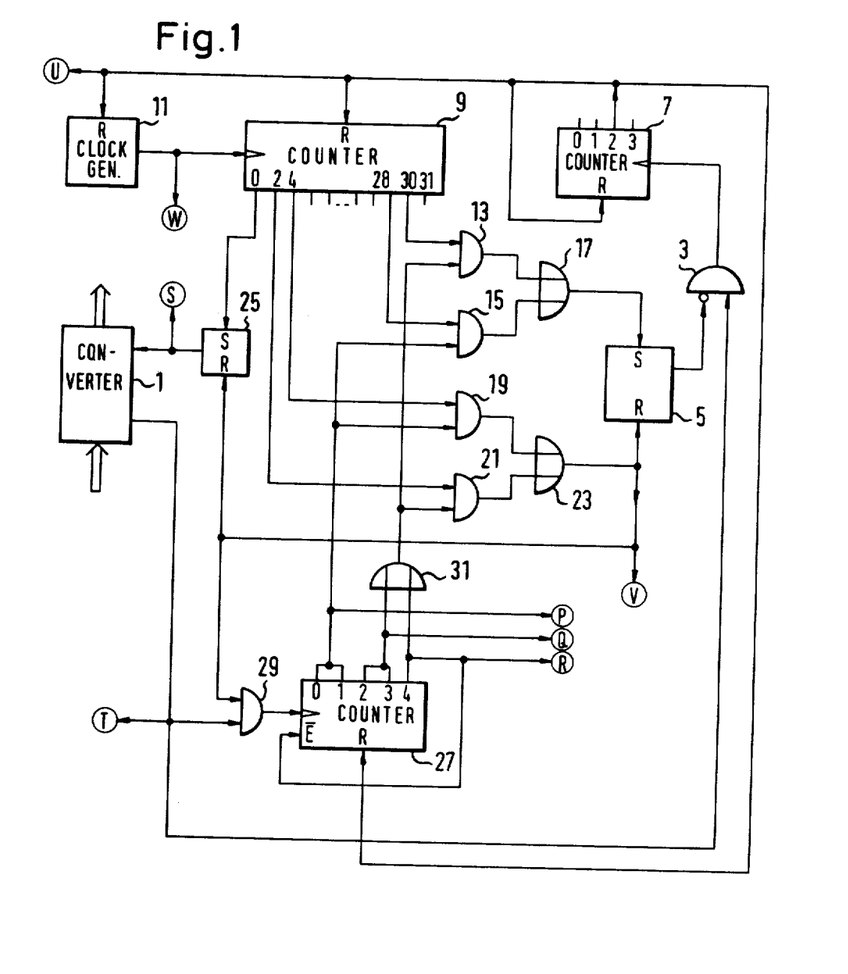
FIG. 1 is a logic circuit diagram of a window generating circuit in accordance with the present invention.

FIG. 1 shows a circuit for determining the start of a message coded in a cyclical error correcting code and for the generation of locally generated synchronization signals which are synchronized to received synchronization signals. Data converter 1 of FIG. 1 of the present application corresponds to a combination of receiver 21 demodulator 171 and converter 169 of FIG. 6 of the parent application. The received synchronization signals are separated from the carrier frequency and are indicated by T in FIG. 1. The synchronization signals can be derived from either pulse edges or the passage through zero of the received synchronization signals or similar criteria. The window signal is generated in a flip-flop 5 and applied to an inverting input of an AND gate 3. A direct input of AND gate 3 receives the received synchronization signals. AND gate 3 is thus conductive for received synchronization pulses only in the absence of the window signal. Thus only received synchronization signals lying outside of the window are transmitted by AND gate 3 to the counting input of a counter 7. AND gate 3 corresponds to AND gate 179 in the parent case and its output signal is used in the parent application as the synchronization signal for synchronizing the window with the last received synchronization signal. The synchronization signal transmitted by the transmitter to denote the beginning of the message which, as mentioned above, is transmitted at a spacing different from the preceding spacings, will thus fall outside of the window and be counted by counter 7. The message is coded in an error correcting code the synchronization is to take place only after a number of received synchronization signals equal to the number of correctable code bits has been received. This is achieved by counter 7 in that counter 7 furnishes an output signal only when the number of correctable errors has been exceeded. In the example, the number of correctable errors is one and counter 7 furnishes an output signal only at the count of 2. The output signal of counter 7 is available at U. The circuit further comprises a counter 9 which counts signals furnished by clock generator 11. Counter 9 corresponds to counter 165 in the parent case, while clock generator 11 corresponds to pulse generator 161 in the parent case. Counter 9 determines the width of the window and, specifically, allows generation of window signals of differing time durations. The outputs 28 and 30 are each connected to one input of AND gate 15 and 13. The outputs of AND gate 15 and 13 are connected to respective inputs of an OR gate 17. The output of OR gate 17 is connected to the said input S of flip-flop 5 and determines the start of the window signal.

Figure 2:
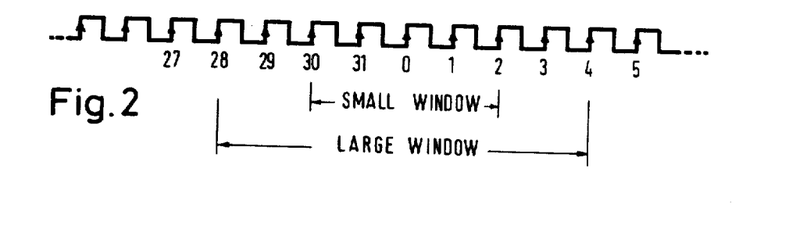
FIG. 2 is a timing diagram of window signals generated in FIG. 1.

Counting outputs 2 and 4 of counter 9 are, correspondingly, connected to respective inputs of an AND gate 21 and 19. The outputs of AND gates 19 and 21 are connected to respective inputs of an OR gate 23 whose output is connected to the reset input of flip-flop 5 and determines the end of the window signal. AND gates 13 and 21 are enabled simultaneously and define the beginning and end of a small window, that is a window of short time duration (FIG. 2) while AND gates 15 and 19 which are also enabled simultaneously define the beginning and end of a larger window. Both the larger and the smaller window are positioned symmetrically to the zero count of counter 9. The zero count on counter 9 thus defines the center of the window. It is also defines the time instant at which the locally generated synchronization signals S are generated. Locally generated synchronization signals S are generated in a flip-flop 25 which is generated when the count on counter 9 passes through zero. Flip-flop 25 is blocked at the end of the time window by a signal V derived from the output of OR gate 23. The S signals are applied to converter 1 for synchronization purposes.

The time duration of the window is shortened in dependence on the number of received synchronization signals T. For this purpose a counter 27 is provided which has a counting input receiving the received synchronization signals T through an AND gate 29. Counting output 0 and 1 of counter 27 are connected in common to one input each of AND gate 15 and 19. These counts thus enable the larger window. Counting outputs 2 and 3 are connected in common to one input of an OR gate 31 whose other input is connected to counting output 4 of counter 27. The output of OR gate 31 enables AND gates 13 and 21, thereby generating the smaller window. Counter 27 thus constitutes a window control counter, the common counting output of counting outputs 1 and 2 being denoted by P, the common output of counting outputs 2 and 3 being denoted by Q, while the fourth counting output is denoted by R. P, Q, and R are thus duration control signals and, as will be discussed in greater detail below, also constitute phase control signals for the window and are therefore, in general, referred to as window control signals herein.

A blocking input of counter 27 is denoted by $\overline{E}$ is directly connected to counting output 4 of counter 27. Counter 27 thus blocks as soon as the count of 4 is reached. AND gate 29 causes the time duration of the window to be adjusted at the end of the window and not during the window. It must therefore be assumed that the signal T remains at logic "1" for a time which exceeds one-half the width of the window. Signal U is applied to the reset input of counter 9 and resets counter 9 to zero. Thus the center of the window, which corresponds to the count of zero on counter 9, coincides in time with the received synchronization signal T which falls outside of the window. Signal U is also used to reset and synchronize clock generator 11, counter 7 and counter 27.

Figure 3:
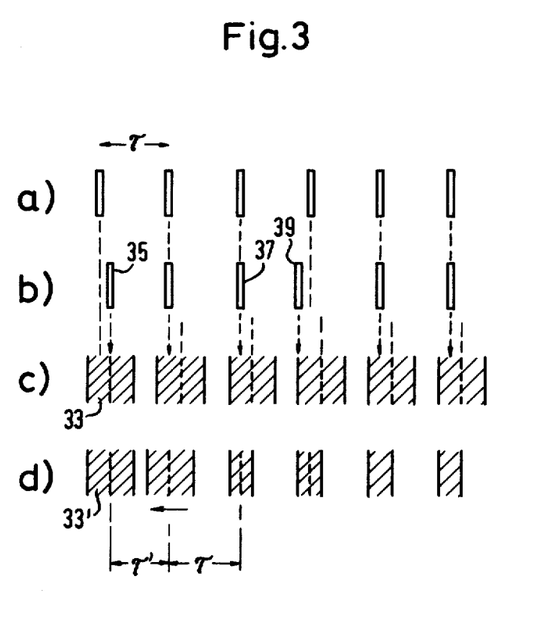

A circuit of FIG. 1 generates window signals whose duration varies as a function of received synchronization signals T. The decrease in the time duration of the window increases the susceptibility to error in a high degree. However, the width of the window cannot be decreased to an arbitrary extent because of the time variation in the received synchronization signals resulting from jitter and other asymmetries resulting from distortion during transmission. The effect of such asymmetries will be explained with reference to FIG. 3. FIG. 3a illustrates the synchronization pulses at the transmitter. These are generated at a spacing in time denoted by $\tau$, that is at a predetermined pulse repetition frequency of $1/\tau$. In FIG. 3b the received synchronization signals are shown in their relative positions in time with respect to the time instance corresponding to the spacing $\tau$. FIG. 3c shows the windows, the first of which is synchronized to receive synchronization signal 35 of FIG. 3b. (Actually, window 33, the first window of FIG. 3c, is synchronized to a received synchronization signal preceding signal 35 by a time interval $\tau$. For the sake of simplicity, this delay by one pulse is omitted in this discussion, although applicable to all synchronization signals in line 3b.) The window must be sufficiently broad that subsequently received synchronization signals are encompassed therein even when they occur without jitter, with maximum jitter preceding the average time instant at which they would otherwise occur and with maximum jitter following such a time instant. The first two above-mentioned instances are illustrated by received synchronization signals 37 and 39 of FIG. 3b, respectively. FIG. 3d illustrates that the time duration of the window may be decreased if the phase shift in subsequent windows resulting from asymmetries of the received synchronization signal 35 are decreased or eliminated. In FIG. 3d, window 33' is synchronized to an asymmetrical received synchronization signal 35. The phase shift between the center of the window and the average time instant at which the synchronization signals are normally received is compensated for by changing the time spacing $\tau$ to $\tau'$.

Figure 4:
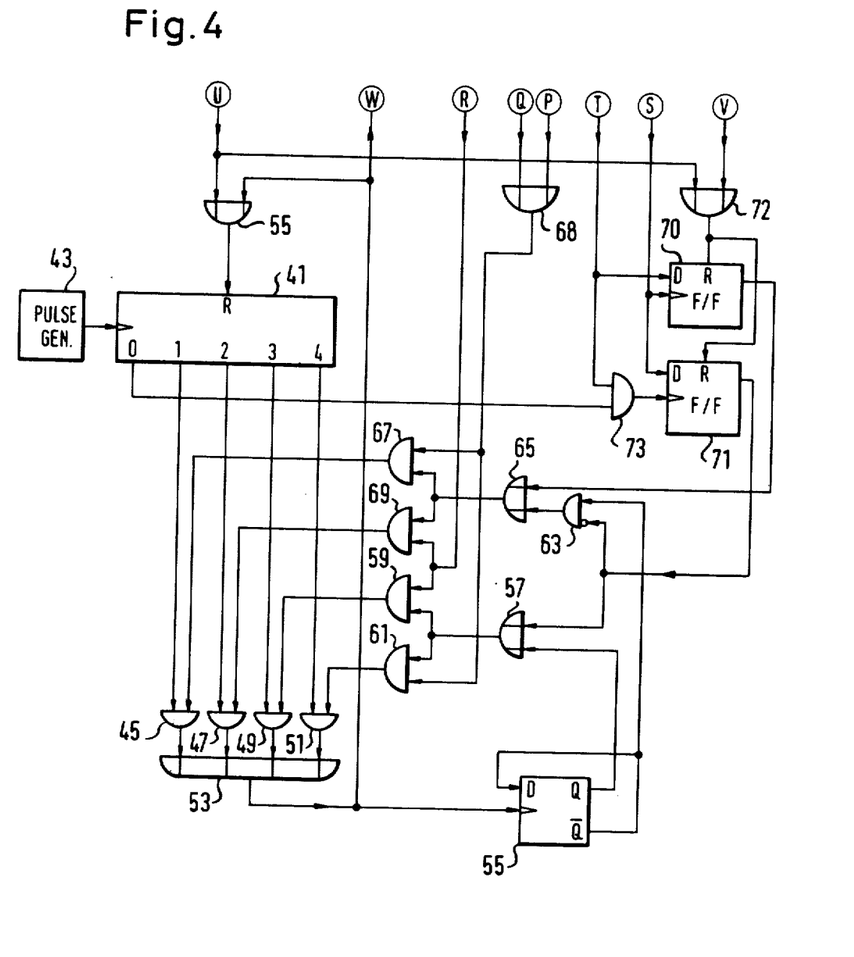
FIG. 4 is a logic circuit diagram of the clock generator of FIG. 1.

FIG. 4 shows the circuit of clock generator 11 which allows the introduction of such a phase correction. Clock generator 11 generates a sequence of clock signals W, whose spacing in time oscillates about an average value. The average value is so chosen that counter 9 (FIG. 1) generates the windows spaced from each other by a time interval $\tau$. Specifically, clock generator 11 generates clock pulses at spacings in time which are alternately increased and decreased relative to spacing $\tau$. A phase shift of the window and therefore of the locally generated synchronization signal S generated at the center of the window is effected by comparing the phase of signals S to that the signals T and causing the time interval between pulses W to be either lengthened or shortened in correspondence to the result of the comparison. To accomplish, this, clock generator 11 comprises a pulse generator 43 whose output pulses are counted by a counter 41. Counter 41 is, preferably, a ring counter. Counting outputs 1, 2, 3 and 4 of counter 41 are applied to the first inputs of AND gates 45, 47, 49 and 51, respectively. The outputs of AND gates 45–51 are connected to inputs of an OR gate 53 whose output is connected through an OR gate 55' to the reset input of counter 41. Counter 41 is reset to zero whenever the count on this counter reaches the number selected by the enabled one of AND gates 45–51. A flip-flop 55 (bistable control means) has a clock input connected to the output of OR gate 53. The D input of flip-flop 55 is directly connected to the $\overline{Q}$ output of flip-flop 55. This causes flip-flop 55 to change state in response to each signal from OR gate 53. The Q output of flip-flop 55 is connected to one input of an OR gate 57. The output of OR gate 57 is connected to one input each of AND gates 59 and 61. The outputs of AND gates 59 and 61 are connected, respectively, to the first input of AND gate 49 and 51. Therefore, if a "1" signal appears at the $\overline{Q}$ output of flip-flop 55, counter 41 will count to counts 3 or 4 depending on which of AND gates 49 and 51 is enabled, that is whether signal R or one of signals Q and P is at a "1" level. Similarly, the $\overline{Q}$ output is connected to one input of an OR gate 65 through an AND gate 63. The output of OR gate 65 is connected to inputs of AND gates 69 and 67. The outputs of AND gates 67 and 69 respectively control AND gates 45 and 47, so that counter 41 will count either to a count of 1 or a count of 2 depending upon which of AND gates 67 is energized, that is depending upon whether the signal R or one of signals Q and P is at the "1" level.

In the absence of a signal from a flip-flop 71, which will be discussed in greater detail below, flip-flop 55 causes counter 41 to count alternately to a selected one of counts 1 or 2 or of counts 3 and 4. Which of signals 1 and 2 or of 3 and 4 is selected depends upon the level of signals R, Q, and P. Signals Q and P are applied to respective inputs of an OR gate 68 whose output is connected to one input each of AND gates 61 and 67. Counter 41 will thus count alternately to a count 1 or a count of 4 if either signal Q or signal P is at a "1" level. Signal R is directly applied to one input each of AND gates 59 and 69, so that counter 41 will, when signal R is at a "1" level, count alternately to counts 2 and 3. It will be noted that the average value of both groups, that is count 1 and 4 on the one hand and counts 2 and 3 on the other hand, is 2.5. This average count corresponds to the average interval between sequential pulses W applied to counter 9 of FIG. 1. If one of signals Q and P is at a "1" level, the time at which pulses Q are furnished varies by a relatively large time increment from the average value. If the signal R is at a "1" level, pulses W alternately precede and follow the average time instant by a small time interval.

The time shift effected by flip-flop 55 can be suppressed by the output of a phase comparator comprising flip-flops 70 and 71. Either the count of counter 41 which shortens the interval between pulses W or that count which lengthens the time interval between pulses W can be suppressed depending upon whether the received synchronization signal T lags or leads the locally generated synchronization signals S. Specifically, the T signals are applied to the clock input of flip-flop 71 through an OR gate 73, while the signals S are applied to the clock input of flip-flop 70. The D input of flip-flop 70 is connected to receive the T signals, while the D input of flip-flop 71 receives the S signals. Flip-flop 70 therefore furnishes a "1" signal only when signal T leads signal S. Flip-flop 71 furnishes a "1" signal if signal T lags behind signal S. The output signal of flip-flop 70 is directly applied to one input of OR gate 65, causing AND gates 67 and 69 and therefore AND gates 45 and 47 to become conductive. Counter 41 therefore counts either to the count of 1 or to the count of 2 depending on the value of signals R, Q and P whenever signal T leads signal S.

Flip-flop 71 furnishes a "1" signal when signal T lags signal S. Signal T is applied to the counting input of flip-flop 71 through an AND gate 73 whose other input is connected to the zero counting output of counter 41. AND gate 73 causes the signal applied to the clock input of flip-flop 71 to be unambiguous with respect to time. The output of flip-flop 71 is connected through OR gate 57 to AND gates 59, 61. Counter 41 therefore counts to one of counting outputs 3 or 4, (depending upon which of signals R, Q and P is at the "1" level) when signal T lags signal S. The output of flip-flop 71 is also connected to an inverting input of AND gate 63 so that the Q output of flip-flop 55 becomes ineffective when signal T lags signal S.

Counter 41 and flip-flop 70 and 71 are reset by the output of counter 7 (FIG. 1). As mentioned above, counter 7 furnishes an output signal when the number of received synchronization signals falling outside of the window exceeds the number of correctable errors in the code being used. Again as mentioned above the output of counter 7 resets counter 9 and thereby synchronizes the center of the window. Flip-flop 70 and 71 are also reset by the signal V furnished by OR gate 23 of FIG. 1. Signal V denotes the end of the window.

The degree of phase correction depends upon the level of signals R, Q and P. These signals are generated in counter 27 of FIG. 1. When the count on counter 27 is either zero or one, signal P is the "1" level. For counts 2 and 3 signal Q is at a "1" level, while for count 4 at which counter 27 blocks, the signal R is at the "1" level. Signals P and Q both result in large phase corrections, while signal R effects the smaller phase correction. However, while signal Q is effective, the size of the window has already been decreased, thereby increasing the synchronization accuracy. When counter 27 blocks, the phase correction magnitude is also decreased thereby again increasing the synchronization accuracy.

Figure 5:
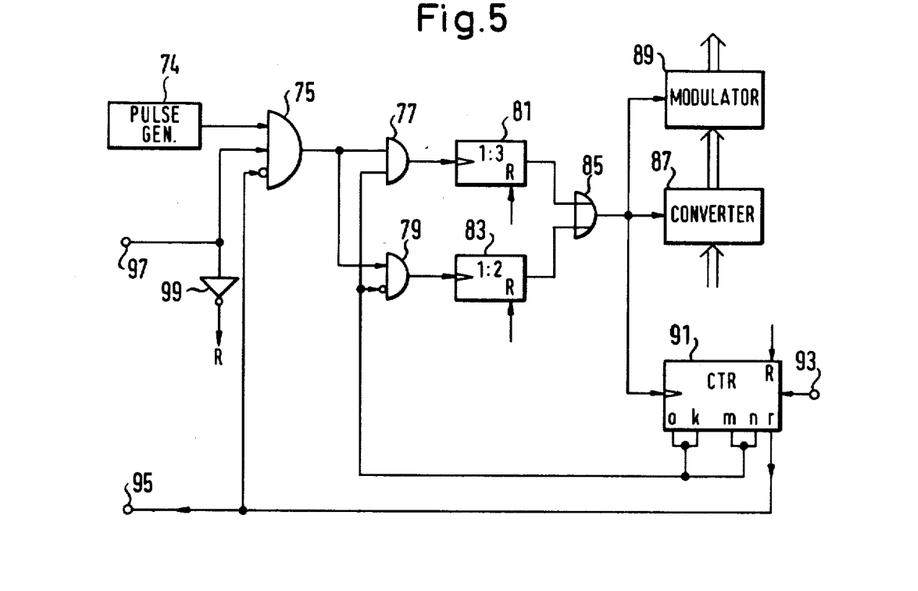
FIG. 5 is a schematic block diagram of the circuits generating the synchronization signals at the transmitter.
Figure 6:
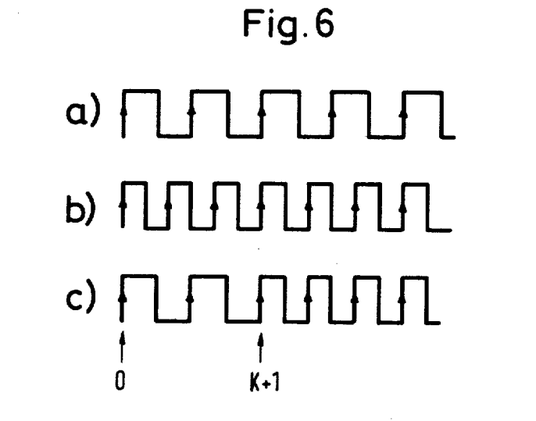

FIG. 5 is a logic circuit diagram of the synchronization signal generating circuit at the transmitter. The pulse sequence to be generated must contain a sequence of synchronization signals generated at predetermined time intervals and preceded by at least one synchronization signal which signifies the start of the message and which will fall outside of the time window at the receiver. The end of the message is also to be indicated by synchronization signals lying outside of the window so that the end of the message is protected from noise signals. FIG. 5 shows a pulse generator 74 whose output is applied to one input of an AND gate 75. The output of AND gate 75 is applied to one input each of AND gates 77 and 79. The output of AND gate 77 is applied to the input of a divider 81 which divides in the ratio 1:3. The output of AND gate 79 is connected to the input of a divider 83 which divides in a ratio of 1:2. The outputs of dividers 81 and 83 are connected to respective inputs of an OR gate 85 whose output is applied to a converter 87 which also accepts data signals and a modulator 89 which receives the output from converter 87. The output of OR gate 85 is also applied to the counting input of a counter 91. Counts O to k of counter 91 are applied to a direct input of AND gate 77 and to an inverting input of AND gate 79. While the counter is counting from O to k, AND gate 77 is conductive and divider 81 furnishes the output signal shown in FIG. 6a. The arrows in FIG. 6 indicate that part of the pulses which determine the actual time instant at which the signal becomes effective. While counter 91 counts from k+1 to m−1, AND gate 77 is blocked AND gate 79 is conductive. The output of divider 83 shown in FIG. 6b is applied to converter 87 and modulator 89 as well as counter 91. It will be noted that the period of the pulses is less than that shown in FIG. 6a. When the counter reaches count m, AND gate 77 again becomes effective and remains effective until the counter reaches n. When the counter reaches count r which is the count immediately following count n, a signal is furnished at a terminal 95 which denotes the end of the message. The signal from counting output of r of counter 91 is also applied to an inverting input of AND gate 75, thereby stopping further transmission of signals through this gate.

The signals shown in FIG. 6a fall outside of the window when received at the receiver. They thus cause the synchronization signals generated at the receiver to be synchronized to the signals transmitted by the circuit of FIG. 5. While divider 81 is effective, that is while counter 91 from k+1 to count m−1, the actual message is being sent and the synchronization signals fall within the window generated at the receiver. Towards the end of the message, divider 81 again becomes effective causing the synchronization signal received by the receiver to fall outside of the window. The next signal then signifies the end of the message. Counter 91 has an input 93 which adjusts counts m and k to correspond to the length of the message. The transmission is initiated by an enabling signal furnished at a terminal 97. This signal is also supplied to one input of AND gate 75. Further, the enabled signal after passing through a differentiating inverter 99 causes divider 81, 83, counter 91 and possibly converters 87 and 89 to be set to an initial position.

The following data applies to a preferred embodiment:
(1) Average transmitted synchronization pulse repetition rate: 2,400 cycles
(2) Base frequency of clock generator 11: 26,800 cycles
(3) Time duration of small window: 52μ
(4) Time duration of large window: 204μ
(5) Pulse width of signal V 73μ
(6) Pulse repetition rate (frequency) of pulse generator 43: 72,000 cycles
(7) Number of correctable errors in code: one isochron error less than the number of the additional transmitter synchronisation signals
(8) Frequency of pulse generator 74: 48,000 cycles
(9) For counter 91:
   k=7
   m=64
   n=65
   r=68

While the invention has been illustrated in preferred embodiments, it is not to be limited to the circuits and structures shown, since many variations thereof will be evident to one skilled in the art and are intended to be encompassed in the present invention as set forth in the following claims.

I claim:

1. System for synchronizing locally generated synchronization signals to received transmitter synchronization signals, comprising, in combination, transmitting means for transmitting a sequence of transmitter synchronization signals and a message having a starting end and a terminating end said sequence of transmitter synchronization signals comprising a plurality of transmitter synchronization signals spaced from each other at predetermined transmitter time intervals and at least one additional transmitter synchronization signal spaced from an adjacent one of said transmitter synchronization signals by a changed time interval unequal to said transmitter time interval for signifying at least one of said message ends;

and a receiver comprising receiving means for receiving said sequence of transmitter synchronization signals and said message and furnishing a sequence of received synchronization signals in response thereto, window signal generating means for generating a sequence of window signals spaced in time from each other by a window spacing corresponding to said predetermined transmitter time interval, coincidence circuit means connected to said window signal generating means and said receiving means for furnishing a coincidence output signal in response to a received synchronization signal occurring in the absence of said window signal and retiming said sequence of window signals in response thereto, and local synchronization signal furnishing means connected to said window signal generating means for furnishing said locally generated synchronization signals at a predetermined synchronization time in each of said window signals.

2. A system as set forth in claim 1, wherein each of said window signals has a window signal duration;

further comprising window signal duration varying means connected to said window signal generating means for varying said duration of said window signals.

3. A system as set forth in claim 2, wherein said window signal duration varying means comprises means for decreasing said duration of said window signals.

4. A system as set forth in claim 3, wherein said local synchronization signal furnishing means comprises means for furnishing said locally generated synchronization signals in the center of each of said window signals.

5. A system as set forth in claim 3, wherein said window signal generating means comprises clock signal generating means for furnishing a sequence of clock signals;

ring counter means having a counting input connected to said clock signal generating means and a plurality of counting outputs for continually counting said clock signals and furnishing counting output signals corresponding to the number of so-counted clock signals at said counting outputs, and bistable window circuit means having a set and reset input respectively connected to a first and second selected one of said counting outputs for switching to a set state furnishing said window signal upon receipt of a signal at said set input.

6. A system as set forth in claim 5, wherein said window signal duration varying means comprises first and second duration logic means connected to said bistable window circuit means for maintaining said bistable window circuit means in said set state for a first duration and a second duration less than said first duration, respectively, when activated, and duration logic activating means connected to said duration logic means and said receiving means for counting said received synchronization signals and activating said first or said second duration logic means in dependence on the number of so-counted received synchronization signals.

7. A system as set forth in claim 6, wherein said duration logic activating means comprises duration control counting means for counting at least selected ones of said received synchronization signals and furnishing a first, second and third duration control signal corresponding, respectively, to a first, second and third number of so-counted received synchronization signals, and connecting means interconnected between said duration control counting means and said first and second duration logic means in response to said first duration control signal and said second duration logic means in response to said second or said third duration control signal.

8. A system as set forth in claim 2, wherein said receiver further comprises phase comparator means connected to said local synchronization signal furnishing means and said receiving means for comparing the phase of said received synchronization signal to the phase of said locally generated synchronization signal and furnishing a first and second phase comparator output signal or when said locally generated synchronization signal respectively precedes or follows said received synchronization signal; and wherein said window signal generating means further comprises means for varying said window signal spacing under control of said first and second phase comparator output signal.

9. A system as set forth in claim 8, wherein said window signal generating means comprises clock signal generating means for furnishing a sequence of clock signals, and ring counter means connected to said clock signal generating means for counting said clock signals, said ring counter means having counting outputs for furnishing counting output signals corresponding to the so-counted number of clock signals; and wherein said clock signal generating means constitutes said means for varying said window signal spacing.

10. A system as set forth in claim 9, wherein said clock signal furnishing means comprises pulse generating means for furnishing a sequence of pulses, pulse counter means having a counting input connected to said pulse generating means, a reset input, and a plurality of pulse counter outputs for counting said pulses and furnishing output signals signifying the number of so-counted pulses at said pulse counter outputs, first control means connected to said phase comparator means and said pulse counter means for selecting a predetermined one of said counter output signals under control of said first and second phase comparator output signals, and second control means connected to said first control means for furnishing said clock signal upon receipt of the so-selected counter output signal.

11. A system as set forth in claim 10, further comprising bistable control means connected to said second control means and said first control means for alternately selecting pulse counter output signals increasing and decreasing said window signal spacing in response to sequential ones of said clock signals in the absence of said phase comparator output signals.

12. A system as set forth in claim 10, wherein said window signal generating means further comprises window control counting means having an input connected to said receiving mean, for counting said received synchronization signals and furnishing a first, second and third window control signal signifying a predetermined first, second and third number of so-counted received synchronization signals; and wherein said first control means further comprises means for selecting pulse counter output signals for increasing or decreasing said window signal spacing under control of said phase comparator output signals with a magnitude controlled by said first, second and third window control signals.

13. A system as set forth in claim 1, wherein said message is coded in an error correcting code allowing correction of a predetermined number of bits;

and wherein said coincidence circuit means comprises means for furnishing a coincidence output signal only upon receipt of a predetermined number of received synchronization signals in the absence of said window signals, said predetermined number of received synchronization signals exceeding said number of correctable bits by one.

* * * * *